(12) United States Patent
Ahmed et al.

(10) Patent No.: US 12,438,578 B2
(45) Date of Patent: Oct. 7, 2025

(54) METHOD FOR ENABLING EFFICIENT MIMO PROCESSING FOR O-RAN FRONTHAUL INTERFACE IN CLOUD RAN SYSTEMS

(71) Applicant: MAVENIR NETWORKS, INC., Richardson, TX (US)

(72) Inventors: Wessam Afifi Ahmed, Plano, TX (US); Sung Joon Maeng, Raleigh, NC (US); Young-Han Nam, Plano, TX (US); Sridhar Rajagopal, Plano, TX (US)

(73) Assignee: Mavenir Networks, Inc., Richardson, TX (US)

( * ) Notice: Subject to any disclaimer, the term of this patent is extended or adjusted under 35 U.S.C. 154(b) by 239 days.

(21) Appl. No.: 17/376,505

(22) Filed: Jul. 15, 2021

(65) Prior Publication Data

US 2022/0021423 A1 Jan. 20, 2022

Related U.S. Application Data

(60) Provisional application No. 63/053,967, filed on Jul. 20, 2020.

(51) Int. Cl.
*H04B 7/0456* (2017.01)
*H04B 7/0452* (2017.01)
*H04L 5/00* (2006.01)
*H04W 72/21* (2023.01)

(52) U.S. Cl.
CPC ......... *H04B 7/0456* (2013.01); *H04B 7/0452* (2013.01); *H04L 5/0048* (2013.01); *H04W 72/21* (2023.01)

(58) Field of Classification Search
None
See application file for complete search history.

(56) References Cited

U.S. PATENT DOCUMENTS 11,528,683 B2 * 12/2022 Rhim .................... H04L 5/0007
2019/0174527 A1    6/2019 Park et al.
(Continued)

FOREIGN PATENT DOCUMENTS

WO    WO-2020256609 A1 * 12/2020 ........... H04B 7/0413

OTHER PUBLICATIONS 5G fundamental: functional split overview (Year: 2019).*
(Continued)

*Primary Examiner* — Luna Weissberger
(74) *Attorney, Agent, or Firm* — Ruggiero McAllister & McMahon LLC

(57) ABSTRACT

A method of generating and applying combining weights to Physical Uplink Shared Channel (PUSCH) symbols for Open Radio Access Network (O-RAN) fronthaul interface between O-RAN radio unit (O-RU) and O-RAN distributed unit (O-DU) includes: calculating, by the O-DU, a codebook; sending, by the O-DU, the codebook to O-RU; generating, by the O-RU, an RU combiner matrix, using the codebook; applying, by the O-RU, the RU combiner matrix to In-phase and Quadrature (IQ) data to generate compressed IQ data; sending, by the O-RU, the compressed IQ data to O-DU; calculating, by the O-DU, a DU combiner matrix from compressed demodulation reference signal (DMRS); and applying, by the O-DU, the DU combiner matrix to data.

2 Claims, 7 Drawing Sheets

(56) References Cited

U.S. PATENT DOCUMENTS

2021/0006371 A1* 1/2021 Raghothaman ....... H04W 72/04
2022/0329289 A1* 10/2022 Huang .................. H04L 5/0048

OTHER PUBLICATIONS

3GPP TSG RAN WG3 NR#98 R3-174415, Further discussion on LLS (Year: 2017).*

O-RAN-Next-Generation-Fronthaul-Conformance-Testing (Year: 2020).*

Extended European Search Report for corresponding European application EP21186189.3, 18 pages, dated Apr. 4, 2022.

ORAN-WG4.CUS.0-v03.00 O-RAN Fronthaul Working Group "Control, User and Synchronization Plane Specification", O-RAN Alliance, Apr. 2020.

ZTE "Further Discussion of LLS" 3GPP Draft; R3-174415 Further Discussion on LLS, 3rd Generation Partnership Project (3GPP); Nov. 2017.

Partial European Search Report for corresponding European application EP21186189.3, 14 pages, dated Dec. 22, 2021.

ORAN-WG4.CUS.0-v02.00 "O-RAN Fronthaul Working Group Control, User and Synchronization Plane Specification", O-RAN Alliance, Aug. 2019.

* cited by examiner

Scheduling and beamforming commands frame format (Section Type "1")

Section Type 1: DL/UL control msgs

| 0 (msb) | 1 | 2 | 3 | 4 | 5 | 6 | 7 (lsb) | # of bytes | |
|---|---|---|---|---|---|---|---|---|---|
| colspan=8 | transport header, see section 3.1.3 | | | | | | | 8 | Octet 1 |
| colspan=8 | dataDirection \| payloadVersion \| filterIndex | | | | | | | 1 | Octet 9 |
| colspan=8 | frameId | | | | | | | 1 | Octet 10 |
| subframeId | | | | slotId | | | | 1 | Octet 11 |
| slotId | | | startSymbolid | | | | | 1 | Octet 12 |
| colspan=8 | numberOfSections | | | | | | | 1 | Octet 13 |
| colspan=8 | sectionType = 1 | | | | | | | 1 | Octet 14 |
| colspan=8 | udCompHdr | | | | | | | 1 | Octet 15 |
| colspan=8 | reserved | | | | | | | 1 | Octet 16 |
| colspan=8 | sectionId | | | | | | | 1 | Octet 17 |
| sectionId | | | | rb | symInc | startPrbc | | 1 | Octet 18 |
| colspan=8 | startPrbc | | | | | | | 1 | Octet 19 |
| colspan=8 | numPrbc | | | | | | | 1 | Octet 20 |
| colspan=8 | reMask[11:4] | | | | | | | 1 | Octet 21 |
| reMask[3:0] | | | | numSymbol | | | | 1 | Octet 22 |
| ef = 1 | | beamId[14:8] | | | | | | 1 | Octet 23 |
| colspan=8 | beamId[7:0] | | | | | | | 1 | Octet 24 |
| colspan=8 | section extensions as indicated by "ef" | | | | | | | var | Octet 25 |
| colspan=8 | sectionId | | | | | | | 1 | Octet N |
| sectionId | | | | rb | symInc | startPrbc | | 1 | N+1 |
| colspan=8 | startPrbc | | | | | | | 1 | N+2 |
| colspan=8 | numPrbc | | | | | | | 1 | N+3 |
| colspan=8 | reMask[11:4] | | | | | | | 1 | N+4 |
| reMask[3:0] | | | | numSymbol | | | | 1 | N+5 |
| ef = 0 | | beamId[14:8] | | | | | | 1 | N+6 |
| colspan=8 | beamId[7:0] | | | | | | | 1 | N+7 |
| colspan=8 | section extensions as indicated by "ef" | | | | | | | var | Octet M |

RAH

Fig. 1A

METHOD FOR ENABLING EFFICIENT MIMO PROCESSING FOR O-RAN FRONTHAUL INTERFACE IN CLOUD RAN SYSTEMS

CROSS-REFERENCE TO RELATED APPLICATIONS

The present application claims the benefit of U.S. Provisional Patent Application No. 63/053,967, filed on Jul. 20, 2020, which is incorporated by reference herein in its entirety.

BACKGROUND OF THE DISCLOSURE

1. Field of the Disclosure

The present disclosure relates to systems and methods for Radio Access Networks (RANs), and relates more particularly to Open RANs (O-RANs) for $4^{th}$-Generation (4G) and $5^{th}$-Generation (5G) based mobile networks.

2. Description of the Related Art

Conventional RANs were built employing an integrated unit where the entire RAN was processed. Conventional RANs implement the protocol stack (e.g., Physical Layer (PHY), Media Access Control (MAC), Radio Link Control (RLC), Packet Data Convergence Control (PDCP) layers) at the base station (also referred to as the evolved node B (eNodeB or eNB) for 4G LTE or next generation node B (gNodeB or gNB) for 5G NR). In addition, conventional RANs use application specific hardware for processing, which make the conventional RANs difficult to upgrade and evolve. As future networks evolve to have massive densification of networks to support increased capacity requirements, there is a growing need to reduce the capital and operating costs of RAN deployment and make the solution scalable and easy to upgrade.

Cloud-based Radio Access Networks (CRANs) are networks where a significant portion of the RAN layer processing is performed at a baseband unit (BBU), located in the cloud on commercial off the shelf servers, while the radio frequency (RF) and real-time critical functions can be processed in the remote radio unit (RRU), also referred to as the radio unit (RU). The BBU can be split into two parts: centralized unit (CU) and distributed unit (DU). CUs are usually located in the cloud on commercial off the shelf servers, while DUs can be distributed. The BBU may also be virtualized, in which case it is also known as vBBU. Radio Frequency (RF) interface and real-time critical functions can be processed in the remote radio unit (RRU).

For the RRU and DU to communicate, an interface called the fronthaul is provided. $3^{rd}$ Generation Partnership Project (3GPP) has defined 8 options for the split between the BBU and the RRU among different layers of the protocol stack. There are multiple factors affecting the selection of the fronthaul split option such as bandwidth, latency, implementation cost, virtualization benefits, complexity of the fronthaul interface, expansion flexibility, computing power, and memory requirement. One of the splits recently standardized by O-RAN Alliance is split option 7-2× (Intra-Physical (PHY) layer split). In the uplink (UL), Fast Fourier Transform (FFT), Cyclic Prefix (CP) removal, and possibly pre-filtering functions reside in the RU, while the rest of PHY functions reside in the DU. In the downlink (DL), inverse Fast Fourier Transform (iFFT), CP addition, and beamforming functions reside in the RU, the rest of PHY functions reside in the DU. This split has multiple advantages such as simplicity, transport bandwidth scalability, beamforming support, interoperability, support for advanced receivers and inter-cell coordination, lower O-RU complexity, future proof-ness, interface and functions symmetry.

An Open Radio Access Network (O-RAN) is a totally disaggregated approach to deploying mobile fronthaul and midhaul networks, built entirely on cloud native principles. The O-RAN Alliance issues specifications and releases open source software under the auspices of the Linux Foundation.

An O-RAN Distributed Unit (O-DU) is a part of an O-RAN system typically implemented in software. More specifically, an O-DU is a logical node hosting RLC/MAC/High-PHY layers based on a lower layer functional split.

An O-RAN Radio Unit (O-RU) is a logical node hosting Low-PHY layer and RF processing based on a lower layer functional split. This is similar to 3GPP's "TRP" or "RRH" but more specific in including the Low-PHY layer (FFT/iFFT, PRACH extraction).

O-RAN has selected a single split point, known as "7-2×" but allows a variation, with the precoding function to be located either "above" the interface in the O-DU or "below" the interface in the O-RU. For the most part the interface is not affected by this decision, but there are some impacts namely to provide the necessary information to the O-RU to execute the precoding operation. O-RUs within which the precoding is not done (therefore of lower complexity) are called "Category A" O-RUs while O-RUs within which the precoding is done are called "Category B" O-RUs.

User equipment (UE) is a device allowing a user access to network services, such as a mobile phone.

An uplink (UL) refers to the traffic flow from the UE to the network and through different network components in the uplink direction. From the UE to the O-RU, the interface is air, while the UL traffic from the O-RU to the O-DU can have different forms (e.g., Ethernet connection).

A downlink (DL) refers to the traffic flow through network components in the downlink direction and from the network to the UE. From the O-DU to the O-RU, the fronthaul interface can have different forms (e.g., Ethernet), while from the O-RU to the UE is air interface.

A sounding reference signal (SRS) is a reference signal sent in the UL direction from the UE to the network for the purpose of channel sounding.

4G and/or 5G massive multiple input, multiple output (mMIMO) is an example technology that uses the O-RAN 7.2× specifications. In mMIMO systems, the gNB serves multiple users at the same time using the same time/frequency resources. In UL, UEs send sounding reference signals (SRS) over a relatively long period of time, which are sent to the O-DU from the O-RU via the fronthaul interface. Using the SRS, the O-DU then calculates the channel estimates, user pairing and combining matrix for the scheduled users. The O-DU sends the combining matrix weights to the O-RU, which in return applies these weights to the Physical Uplink Shared Channel (PUSCH) symbols and sends the frequency domain In-phase and Quadrature (IQ) samples to the O-DU.

Although split option 7-2x enables multiple advanced features such as beamforming, UL Coordinated Multi-Point transmission/reception (CoMP), etc., the system performance may degrade in certain scenarios such as UL mMIMO for high-speed UEs. The reason for such degradation in high-speed UEs' scenarios is channel aging, i.e., due to the SRS signals being sent over a relatively long-period of time (e.g., tens of milliseconds). By the time the O-RU applies the combining weights to the PUSCH symbols, these combining weights become inaccurate since the SRS signals are outdated (i.e., SRS to UL-data transmission time interval (TTI) delay is long). In other words, the channel gains between the UEs and the gNB are no longer reflected accurately by the SRS signals (since UEs are moving fast in such scenario), which cause interference and throughput degradation during the combining process in the UL chain.

In a conventional mMIMO UL processing, the following steps are performed:
1) UEs send the SRS signals to the O-RU over the air (OTA).
2) The O-RU applies analog-to-digital conversion (ADC), Fast Fourier Transform (FFT) and cyclic prefix (CP) removal and transfers the frequency-domain (FD) IQ samples of the sounding reference signals (SRS) over all the antennas to the O-DU using O-RAN U-plane message(s) for channel estimation at the O-DU.
3) SRS-based channel estimates are used to compute the combining weights at the O-DU.
4) The O-DU transfers the combining weights to O-RU using O-RAN C-plane message Section type 1, along with section extension 1 or section extension 11.
5) The O-RU applies the combining weights to the received signal (i.e., PUCCH/PUSCH) and transfers data layers to the O-DU for further processing.

The existing O-RAN specifications explain the exact method of sending the C-plane messages in the downlink (DL) direction and sending/receiving the U-plane messages between the O-DU and the O-RU. This method as well as a background on the different planes in the O-RAN specifications are explained in this section.

There are four planes specified in the O-RAN specs namely user-plane (U-plane), control plane (C-plane), synchronization plane (S-plane), and management plane (M-plane). The U-plane refers to IQ sample data transferred between O-DU and O-RU. The C-plane refers specifically to real-time control between O-DU and O-RU and should not be confused with the UE's control plane. The S-plane refers to traffic between the O-RU or O-DU to a synchronization controller, which is generally an IEEE 1588 Grand Master. However, Grand Master functionality may be embedded in the O-DU. The M-plane refers to non-real-time management operations to and from the O-RU. These non-real time management operations are executed by the O-RU and an O-RU controller in both directions. The O-RU controller can reside in the O-DU or a service management and orchestration system (SMO), or can be a separate entity.

An M-plane interface is a link between the O-RU controller and the O-RU that carries non-real-time management information back and forth.

The main purpose of the C-plane messages is to transmit data-associated control information required for processing of user data (e.g., scheduling and beamforming commands). These messages are sent separately for DL-related commands and UL-related commands.

A common frame format is used for C-Plane messages, consisting of a transport layer and an application layer. The application layer is within the transport layer payload and consists of a common header for time reference, followed by information and parameters dependent and specific to the Section Type in use. Multiple sets of section data of the same Section Type value can be lined up one after another within the payload. To minimize packet rate over the interface, transmitter should fill messages with as many subsequent sections (with or without sequential section IDs) as possible.

To simplify the description of the invention, the following sections of the present disclosure focus on a specific combining method (via sending real-time weights) which can be applied to specific section types (Section types 1 and 3) using section extension type 1 (as an example). However, this example should not be interpreted as limiting the scope of the present disclosure since the example method or a variant of the method may be applied to other existing beamforming (also referred to as combining) methods or future beamforming/combining methods that will be standardized by O-RAN alliance.

Section Type 1 is used for most Downlink and Uplink radio channels. The fields of Section type 1 can be explained as follows:
Transport Layer
Application Layer
  Common Header Fields
    dataDirection (data direction (gNB Tx/Rx)) field: 1 bit
    payloadVersion (payload version) field: 3 bits
      value="1" shall be set (1st protocol version for payload and time reference format)
    filterindex (filter index) field: 4 bits
    frameId (frame identifier) field: 8 bits
    subframeId (subframe identifier) field: 4 bits
    slotID (slot identifier) field: 6 bits
    startSymbolid (start symbol id) field: 6 bits
    numberOfsections (number of sections) field: 8 bits
    sectionType (section type) field: 8 bits
      value="1" shall be set
    udCompHdr (user data compression header) field: 8 bits 11
    reserved (reserved for future use) field: 8 bits
  Section Fields
    sectionld (section identifier) field: 12 bits
    rb (resource block identifier) field: 1 bit
    symInc (symbol number increment command) field: 1 bit
    startPrbc (starting PRB of data section description) field: 10 bits
    numPrbc (number of contiguous PRBs per data section description) field: 8 bits
    reMask (resource element mask) field: 12 bits
    numSymbol (number of symbols) field: 4 bits
    ef (extension flag) field: 1 bit
    beamId (beam identifier) field: 15 bits In the method of beamforming/combining via sending real-time weights, the O-DU generates complex combining weights and send these weights to the O-RU via the fronthaul interface.

FIG. 1A illustrates scheduling and beamforming commands frame format for section type "1". Within Section Type 1 message, there could be multiple sections with different section IDs, as shown in FIG. 1A. As shown in FIG. 1A, below the transport header section, a radio application header section (labeled "RAH") is provided, followed by repeated sections each starting with sectionID. The conventional approach for sending the combining weights to the O-RU based on the SRS signal is not efficient for specific scenarios such as high-speed UEs because the SRS signal is sent over a long period of time, after which time the SRS signal may not accurately reflect the actual channel gains between the gNB and the UEs.

FIG. 2 shows the UL O-RAN receiver structure for the conventional multiuser, multiple input, multiple output (MU-MIMO) processing. At block 1011, a fast Fourier transform (FFT) is performed on the received signals, and the output is passed through the RU combiner module 102. The number of output streams of RU combiner module 102 is reduced to the number of UE (U), and the reduced streams are sent to the O-DU.

The RU combiner module 102 of FIG. 2 is generated at O-DU MU-MIMO combiner generator module 1031, and IQ weight matrix W 1051 is sent back to O-RU. Since the O-RU is not able to estimate the channel matrix from SRS and calculate the MU-MIMO combiner matrix, the RU combiner module 102 needs to be calculated at the O-DU and sent back to the O-RU. Note that the O-RU does not have the ability to compute complex algorithms such as channel estimation and zero-forcing (ZF) or Minimum mean square error—interference rejection combining (MMSE-IRC) design.

Pre-processed SRS (signal across all antennas) 1041 is sent to the O-DU to calculate (generate) MU-MIMO combiner at the O-DU MU-MIMO combiner generator module 1031. Since the period of SRS is long (e.g., 10 ms), the channel information on the combiner would be outdated (also referenced as channel aging), and degrades performance. The MU-MIMO combiner would be either ZF or MMSE-IRC, while the RU combiner module 102 could be any type of multi-user combiner.

Accordingly, there is a need for improved methods for calculating (generating) and applying the combining weights to the PUSCH symbols in the context of the O-RAN fronthaul interface.

SUMMARY OF THE DISCLOSURE

First example method for calculating and applying the combining weights according to the present disclosure includes the following:
1) Calculating (generating) the codebook:
  a. The codebook is designed at O-DU and is sent to O-RU.
  b. Alternatively, the codebook can be directly designed by O-RU.
  c. The codebook will be the orthogonal matrix designed by either discrete Fourier transform (DFT) matrix or type I codebook.
2) Selecting the projection matrix at the CAT-B O-RU:
  a. The codebook is given by O-DU (and the codebook is buffered at O-RU), which is used to design RU combining matrix at the O-RU (RU combiner). The buffered codebook does not need to update periodically.
  b. The projection matrix is selected from the best codebook, and N-by-N codebook is reduced to R-by-N projection matrix.
3) Compressing data across all antennas to R streams data at O-RU:
  a. O-RU will send compressed IQ data to O-DU by applying RU combination matrix. In that case, N (the number of base station (BS) antennas) dimension IQ data is reduced to R dimension IQ data.
4) Applying combination matrix at the O-DU
  a. O-DU will calculate the combining matrix by the compressed DMRS. Note that N dimension demodulation reference signal (DMRS) is reduced to R while DMRS is sent from O-RU to O-DU.
  b. The DU combination matrix will be designed by either zero-forcing (ZF) or MMSE-IRC.

For the first example method, an example embodiment provides defining a new combining mode (DMRS-based split combining mode) via M-plane.

Second example method for calculating and applying the combining weights according to the present disclosure includes the following:
1) Calculating the projection matrix at the O-DU and sending it back to CAT-B O-RU:
  a. O-DU will design projection matrix from SRS across all antennas, which SRS is sent from O-RU. O-DU calculates the projection matrix the same way as in the first example method, except SRS is multiplied by the codebook to find the best R rows.
  b. O-DU will send the projection matrix back to O-RU, and O-RU will apply the projection matrix to the RU combiner. The DU combiner design is done as in the first example method.

For the second example method, an example embodiment provides defining a new combining mode (DMRS/SRS-based split combining mode) via M-plane.

Third example method for calculating and applying the combining weights according to the present disclosure includes the following:
1) CAT-B O-RU sends pre-processed DMRS signal (across all antennas) for a given TTI to O-DU.
2) RU buffers the PUSCH samples locally.
3) DU calculates the combiner matrix based on DMRS signal and sends to RU.
4) RU applies the combiner matrix to the buffered IQ data and sends to DU.

For the third example method, an example embodiment provides defining a new mode for UL combining, DMRS-based Single Combiner. In addition, another example embodiment provides defining a new section extension (only applicable for CAT-B O-RUs) associated with the C-plane message to request the O-RU to send the associated U-plane message IQ data (e.g., DMRS across all antennas (i.e., send IQ right away after reception prior to applying the combining matrix).

The example methods and embodiments of the present disclosure are applicable to, e.g., O-RAN compliant distributed units (O-DUs) and O-RAN compliant radio units (O-RUs) that are capable of beamforming/MIMO. The example methods and embodiments of the present disclosure are applicable to, e.g., O-RAN compliant combined central unit (O-CU) and O-DU communicating via the O-RAN fronthaul interface to O-RUs that are capable of beamforming/MIMO. The example methods and embodiments of the present disclosure are applicable to, e.g., O-RAN compliant systems in which both O-DUs and O-RUs can act as evolved NodeB (eNB) and/or next generation NodeB (gNB) that provides wireless connectivity to UEs in licensed (4G and 5G bands), unlicensed (e.g., 5 GHz Unlicensed National Information Infrastructure (UNII) band), and shared spectrum (e.g., Citizens Broadband Radio Services (CBRS) band). The present disclosure also supports any existing/future wireless system that supports beamforming/MIMO and is O-RAN compliant.

BRIEF DESCRIPTION OF THE FIGURES

FIG. 1A illustrates the scheduling and beamforming commands frame format (Section Type "1") according to the O-RAN specifications.

DETAILED DESCRIPTION

Figure 1B:
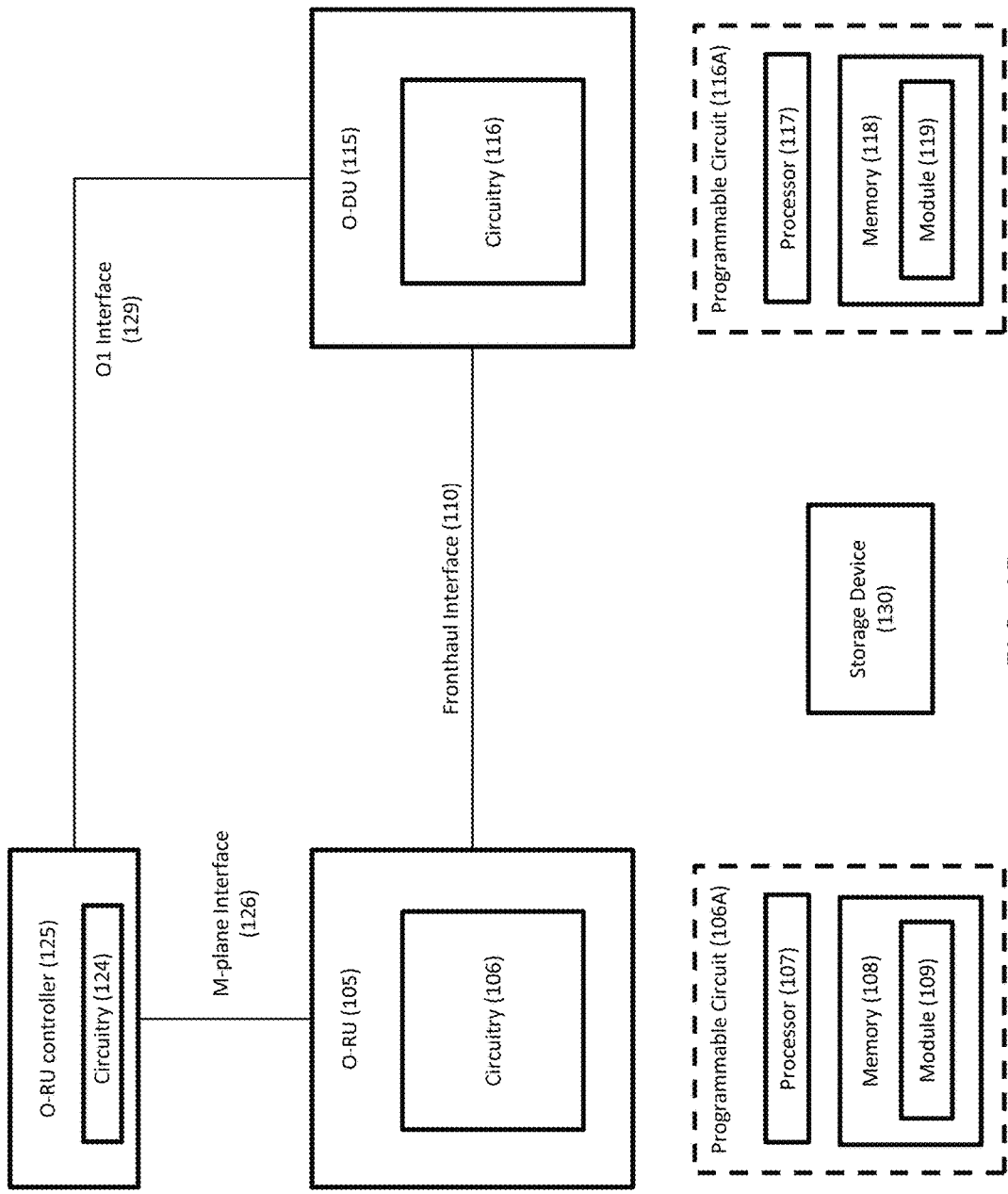
FIG. 1B is a block diagram of an example embodiment of system for enabling efficient MIMO processing for an O-RAN in a cloud RAN.
Figure 2:
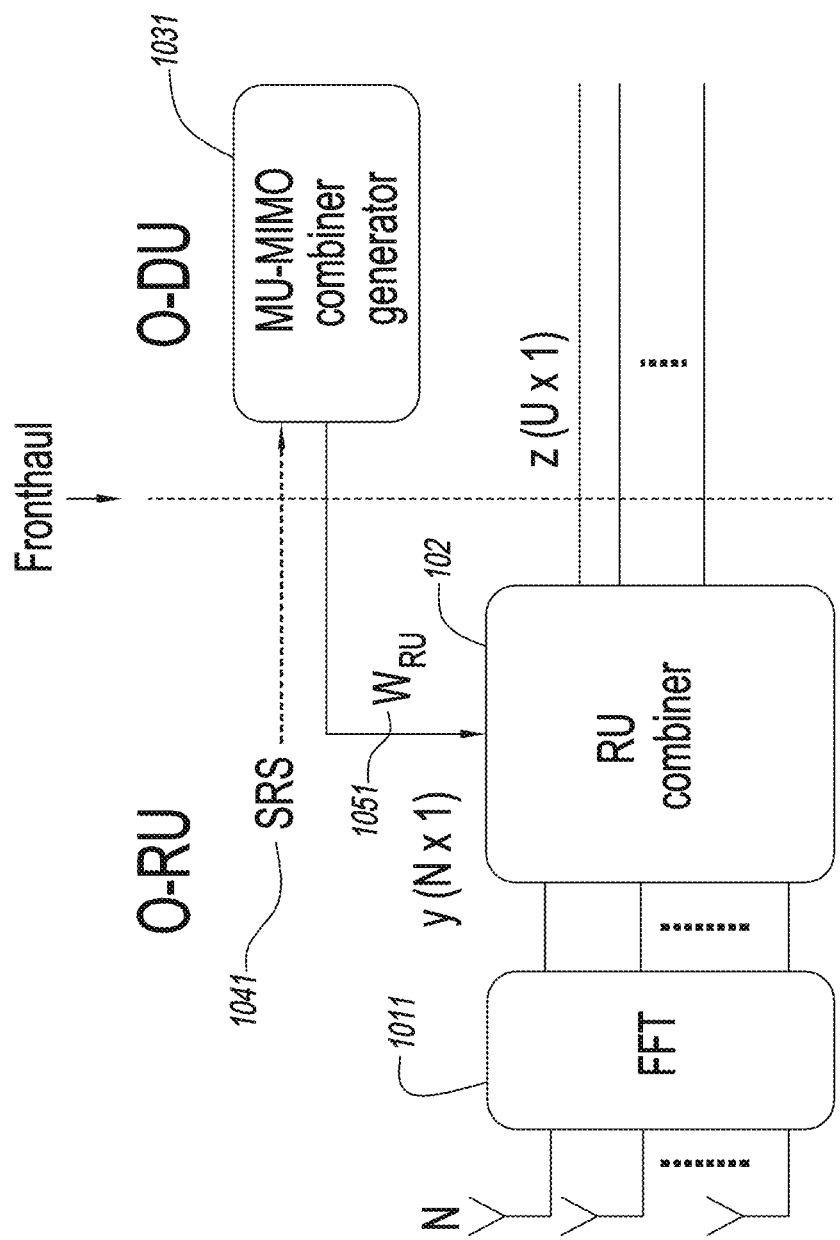
FIG. 2 illustrates the UL O-RAN receiver structure for the conventional MU-MIMO processing.

FIG. 1B is a block diagram of an example embodiment of system 100 for enabling efficient MIMO processing for an O-RAN in a cloud RAN. System 100 includes an O-RU 105 and an O-DU 115 that are communicatively coupled via a fronthaul (FH) interface 110, also referred to herein as FH 110. A variety of data is communicated via FH 110, including DL and UL U-plane data packets, DL C-plane messages that include data sections and section extension data. O-DU 115 instructs O-RU 105 using M-plane and/or C-plane messages regarding i) how to process received messages from O-DU 115 (so that O-RU 105 can send data, reference signals and control information to UE), and ii) how to send messages (received messages from UE) to O-DU 115. O-RU 105 and O-DU 115 cooperate with one another to perform a method that enables efficient MIMO processing in the context of FH 110.

O-RU 105 includes electronic circuitry, namely circuitry 106, that performs operations on behalf of O-RU 105 to execute methods described herein. Circuity 106 may be implemented with any or all of (a) discrete electronic components, (b) firmware, and (c) a programmable circuit 106A. O-RU 105 represents mainly an O-RAN-compliant O-RU which executes the lower physical layer blocks such as FFT/IFFT, CP removal/addition, beamforming, analog to digital converter, digital to analog convertor, and RF functions.

Programmable circuit 106A, which is an optional implementation of circuitry 106, includes a processor 107 and a memory 108. Processor 107 is an electronic device configured of logic circuitry that responds to and executes instructions. Memory 108 is a tangible, non-transitory, computer-readable storage device encoded with a computer program. In this regard, memory 108 stores data and instructions, i.e., program code, that are readable and executable by processor 107 for controlling operations of processor 107. Memory 108 may be implemented in a random access memory (RAM), a hard drive, a read only memory (ROM), or a combination thereof. One of the components of memory 108 is a program module, namely module 109. Module 109 contains instructions for controlling processor 107 to execute operations described herein on behalf of O-RU 105.

O-DU 115 includes electronic circuitry, namely circuitry 116, that performs operations on behalf of O-DU 115 to execute methods described herein. Circuity 116 may be implemented with any or all of (a) discrete electronic components, (b) firmware, and (c) a programmable circuit 116A. O-DU 115 represents an O-RAN compliant O-DU which executes functions such as higher physical layer (based on O-RAN split or similar lower layer splits), MAC, scheduler, and RLC. O-DU 115 can be implemented on proprietary hardware or COTS (commercial over the shelf servers) and it can be on the cloud.

Programmable circuit 116A, which is an optional implementation of circuitry 116, includes a processor 117 and a memory 118. Processor 117 is an electronic device configured of logic circuitry that responds to and executes instructions. Memory 118 is a tangible, non-transitory, computer-readable storage device encoded with a computer program. In this regard, memory 118 stores data and instructions, i.e., program code, that are readable and executable by processor 117 for controlling operations of processor 117. Memory 118 may be implemented in a random access memory (RAM), a hard drive, a read only memory (ROM), or a combination thereof. One of the components of memory 118 is a program module, namely module 119. Module 119 contains instructions for controlling processor 117 to execute operations described herein on behalf of O-DU 115.

The term "module" is used herein to denote a functional operation that may be embodied either as a stand-alone component or as an integrated configuration of a plurality of subordinate components. Thus, each of module 109 and module 119 may be implemented as a single module or as a plurality of modules that operate in cooperation with one another.

While modules 109 and 119 are indicated as being already loaded into memories 108 and 118, respectively, either or both of modules 109 and 119 may be configured on a storage device 130 for subsequent loading into their respective memories 108 and 118. Storage device 130 is a tangible, non-transitory, computer-readable storage device that stores either or both of modules 109 and 119 thereon. Examples of storage device 130 include (a) a compact disk, (b) a magnetic tape, (c) a read only memory, (d) an optical storage medium, (e) a hard drive, (f) a memory unit consisting of multiple parallel hard drives, (g) a universal serial bus (USB) flash drive, (h) a random access memory, and (i) an electronic storage device coupled to O-RU 105 and/or O-DU 115 via a data communications network.

System 100 also includes an O-RU controller 125, M-plane interface 126, and an O1 interface 129. M-plane interface 126 is a communicative link between O-RU controller 125 and O-RU 105. O1 interface 129 is a communicative link between O-RU controller 125 and O-DU 115.

FH 110 is a connection link between O-DU 115 and O-RU 105 that carries control user synchronization (CUS)-plane packets as well as M-plane packets.

O-RU controller 125 is a controller that controls operations of O-RU 105 by exchanging M-plane messages with O-RU 105. O-RU 105 reports its capabilities to O-RU controller 125. Subsequently, O-RU controller 125 configures O-RU 105 to operate via M-plane. The exchange of M-plane messages between O-RU controller 125 and O-RU 105 can be accomplished by way of two possible paths, namely (1) via M-plane interface 126, or (2) via O1 interface 129, O-DU 115, and FH 110. Thus, O-RU 105 can report its capabilities to O-RU controller 125, and O-RU controller 125 can send management configuration data to O-RU 105 either (a) directly, via M-plane interface 126, in a hybrid M-plane architecture, or (b) indirectly, via O1 interface 129, O-DU 115 and FH 110, in a hierarchical architecture or hybrid architecture.

O-RU controller 125 includes electronic circuitry, namely circuitry 124, that performs operations on behalf of O-RU controller 125 to execute methods described herein. Circuity 124 may be implemented with any or all of (a) discrete electronic components, (b) firmware, and (c) a programmable circuit. Circuitry 124 may be implemented similarly to programmable circuit 116A, i.e., with a processor and a memory that contains instructions that are readable by the processor to control the processor to execute operations on behalf of O-RU controller 125.

Although O-RU controller 125 is shown as being a stand-alone device, as an alternative to being a stand-alone device, O-RU controller 125 can reside in either of O-DU 115 a service management and orchestration system (SMO) (not shown), or a network management system (NMS) (not shown).

The SMO is responsible for RAN domain management. The key capabilities of the SMO are: (a) FCAPS interface to O-RAN Network Functions; (b) Non-RT RIC for RAN optimization; and (c) O-Cloud Management, Orchestration and Workflow Management. The SMO performs these services through four key interfaces to the O-RAN Elements: (i) A1 Interface between the Non-RT MC in the SMO and the Near-RT MC for RAN Optimization; (ii) O1 Interface between the SMO and the O-RAN Network Functions for FCAPS support; (iii) In the hybrid model, Open Fronthaul M-plane interface between SMO and O-RU for FCAPS support; and (iv) O2 Interface between the SMO and the O-Cloud to provide platform resources and workload management. The NMS performs FCAP functions and interface for managing network elements.

Figure 3:
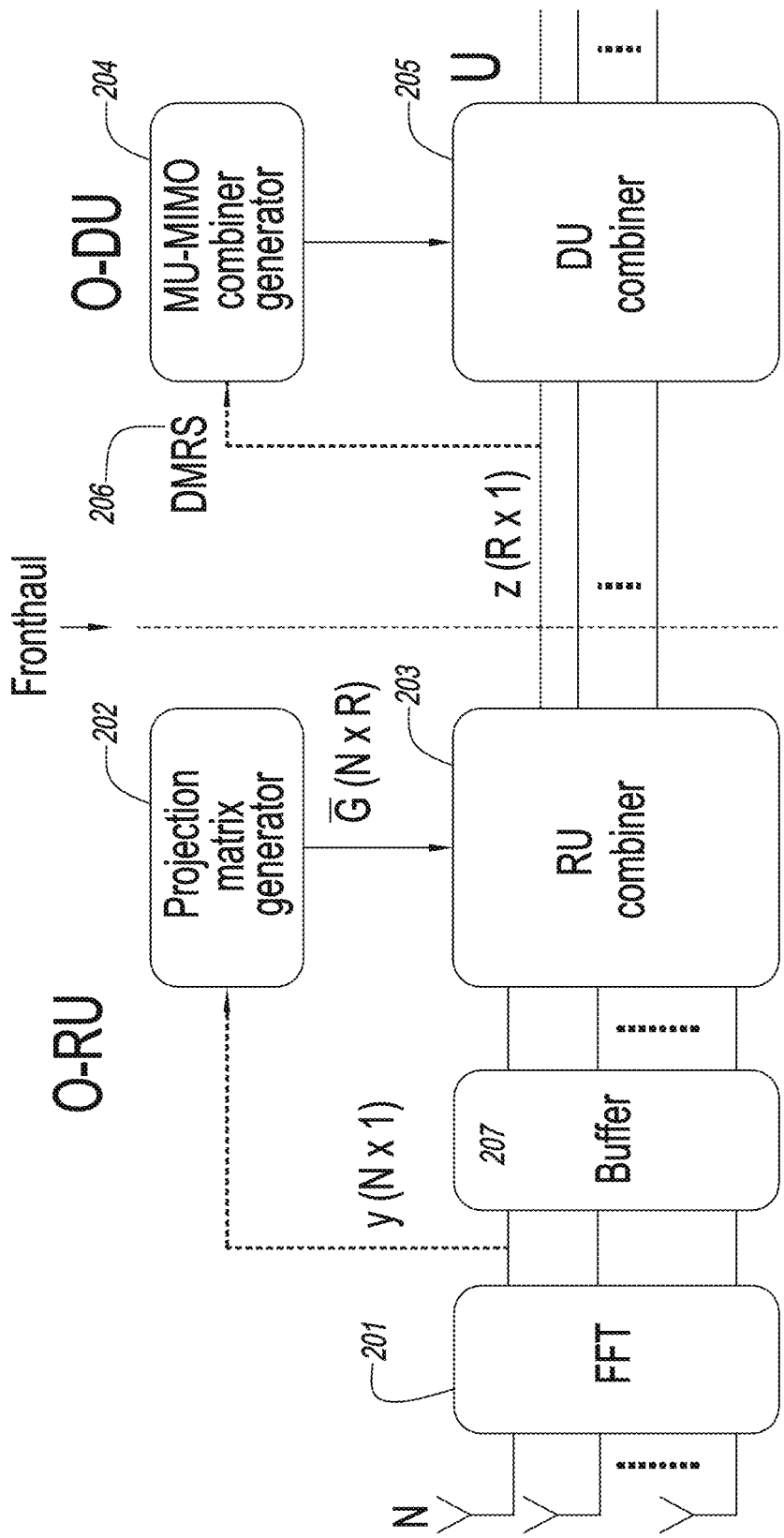
FIG. 3 illustrates a UL O-RAN receiver structure according to first example embodiment of the present disclosure.

FIG. 3 illustrates a UL O-RAN receiver structure according to first example embodiment of the present disclosure. At block 201, a fast Fourier transform (FFT) is performed on the received signals, and the output is buffered (e.g., at buffer 207) until RU combiner module 203 is generated. Then, the output is passed through the RU combiner module 203. The number of output streams of the RU combiner module 203 is reduced to the maximum available number of streams (R), and the reduced streams are sent to the O-DU. Then, O-DU input IQ data applies DU-combiner 205, and the number of streams is reduced to U.

The projection matrix generator 202 can utilize a codebook that is N-by-N orthogonal matrix, which is generated by either discrete Fourier transform (DFT) matrix or type I codebook. The DFT matrix for the codebook is given as:

$$G = \frac{1}{\sqrt{N}}\begin{bmatrix} 1 & 1 & 1 & \ldots & 1 \\ 1 & \omega & \omega^2 & \ldots & \omega^{N-1} \\ 1 & \omega^2 & \omega^4 & \ldots & \omega^{2(N-1)} \\ \vdots & \vdots & \vdots & \ddots & \vdots \\ 1 & \omega^{N-1} & \omega^{2(N-1)} & \ldots & \omega^{(N-1)(N-1)} \end{bmatrix},$$

where $\omega = e^{\frac{-j2\pi}{N}}$.

If the projection matrix generator 202 utilizes a codebook generated by a DFT matrix, the RU combining matrix is generated in the RU combiner 203 using the projection matrix generated from the projection matrix generator 202. The RU combining matrix is applied to the buffered data at the RU combiner 203. Specifically, this can be described in the following manner:

a. multiply the first symbol of received signal of TTI by projection matrix and obtain absolute value as, $$\begin{bmatrix} k_1 \\ \vdots \\ k_N \end{bmatrix} = |Gy|$$

b. find the indices of R the largest elements of k, and define the indices set μ, which is applied to select the best R row of the projection matrix G as, $$\bar{G} = \{G\}_{[\mu,:]}$$

c. obtain the RU combiner 203 as, $$w_{RU} = \bar{G}$$

The codebook by type I codebook can be generated in the following manner:

a. The DFT vector is defined as, $$u_{N,O,m} = \begin{bmatrix} 1 & e^{\frac{j2\pi m}{ON}} & \ldots & e^{\frac{j2\pi m(N-1)}{ON}} \end{bmatrix},$$

where m=0, . . . , ON−1.

b. Then, the aggregate matrix of DFT vector is defined as, $$U_{N,O,p} = [u_{N,O,p}\, u_{N,O,p+O} \cdots u_{N,O,p+O(N-1)}],$$

where p=0, . . . , O−1 c. Then, the following matrix is defined:

$$V_{O_2 p_1 + p_2} = U_{N_1,O_1 p_1} \otimes U_{N_2,O_2 p_2}$$

where we can obtain $V_0, \ldots, V_{O_1 O_2 - 1}$ matrices set, and $N_1$, $N_2$ are the number of vertical antenna elements and horizontal antenna elements of BS antennas, and $\otimes$ is Kronecker product operation.

d. Then, the projection matrix set is defined as, $$G_q = \begin{bmatrix} V_q & \varphi_1 V_q \\ V_q & \varphi_3 V_q \end{bmatrix}, G_{O_1 O_2 + q} = \begin{bmatrix} V_q & \varphi_2 V_q \\ V_q & \varphi_4 V_q \end{bmatrix}$$

where $\varphi = [1\ j\ -1\ -j]$, and we obtain $G_i, \ldots, G_{O_1 O_2 - 1}$ projection matrices.

If the projection matrix generator 202 utilizes a codebook generated by a Type I codebook, the RU combining matrix is generated in the RU combiner 203 using the projection matrix generated from the projection matrix generator 202. The RU combining matrix is applied to the buffered data at the RU combiner 203. Specifically, this can be described in the following manner:

a. Input: i=0, $G_i, \ldots G_{O_1 O_2 - 1}$, y b. Multiply the first symbol of received signal of TTI by i-th projection matrix and obtain absolute value as, $$\begin{bmatrix} k_1 \\ \vdots \\ k_N \end{bmatrix} = |G_i y|.$$

c. Find the indices of R largest elements of $k_i$, and define the indices set $\mu_i$, which is applied to select the best R row of the projection matrix $G_i$ as, $$\bar{G}_i = \{G_i\}_{[\mu_i,:]}.$$

d. Calculate the sum of the absolute value $k_i$ of the selected indices as, $$f_i = \sum_{\mu_i} k_i.$$

e. Set i=+1, and repeat from step b to d until i=$O_1 O_2$−1 f Find the best projection matrix by $$\overline{G}_i^{opt} = \max_{\overline{G}_i} f_i.$$

g. obtain the RU combiner 203 as $$w_{RU} = \overline{G}_i^{opt}.$$

The MU-MIMO combiner at the O-DU MU-MIMO combiner generator module 204 is calculated (generated) based on compressed DMRS 206 (e.g., DMRS across all antennas is compressed by RU combiner). In this disclosure, DMRS is one example of IQ data, but IQ data can also include PUSCH or SRS symbols. The MU-MIMO combiner can be either ZF or MMSE-IRC, while the O-DU combiner 205 can be any type of multi-user combiner. Since the MU-MIMO combiner is calculated (generated) based on DMRS 206, channel aging problem would not happen (DMRS is transmitted every slot). On the other hand, the performance can be degraded by loss from the compression of DMRS 206, which is done by the RU combiner. The generated MU-MIMO combiner (matrix) is sent to the DU combiner 205 and applied on the DU combiner 205.

In connection with the first example embodiment of the present disclosure illustrated in FIG. 3, the impact on the O-RAN operation (i.e., novel modifications provided herein) include the following:

Define a new combining mode via M-plane:
    Default mode can be: existing SRS-based method.
    New mode provided: DMRS-based split combining mode.
    RU should report whether it can support this new mode (DMRS-based split combining mode). One example implementation is adding a new feature in YANG module: o-ran-module-cap.yang Module to allow the RU to report if it can support the new combining mode).
    If yes, DU can configure the O-RU to use this method/mode. One example implementation is modifying YANG: o-ran-uplane-confyang Module to reflect this new configuration.
DU uses default value BeamID=0 (i.e., no combining) and send C-plane messages to RU.
In another example implementation, the codebook is designed at O-DU and is sent to O-RU via M-plane.
RU sends R streams to DU instead of U (data layers for UE).
Define a bit mask in the eAxC ID to include z (R×1) for CAT-B (i.e., streams instead of layers for CAT-B).

Figure 4:
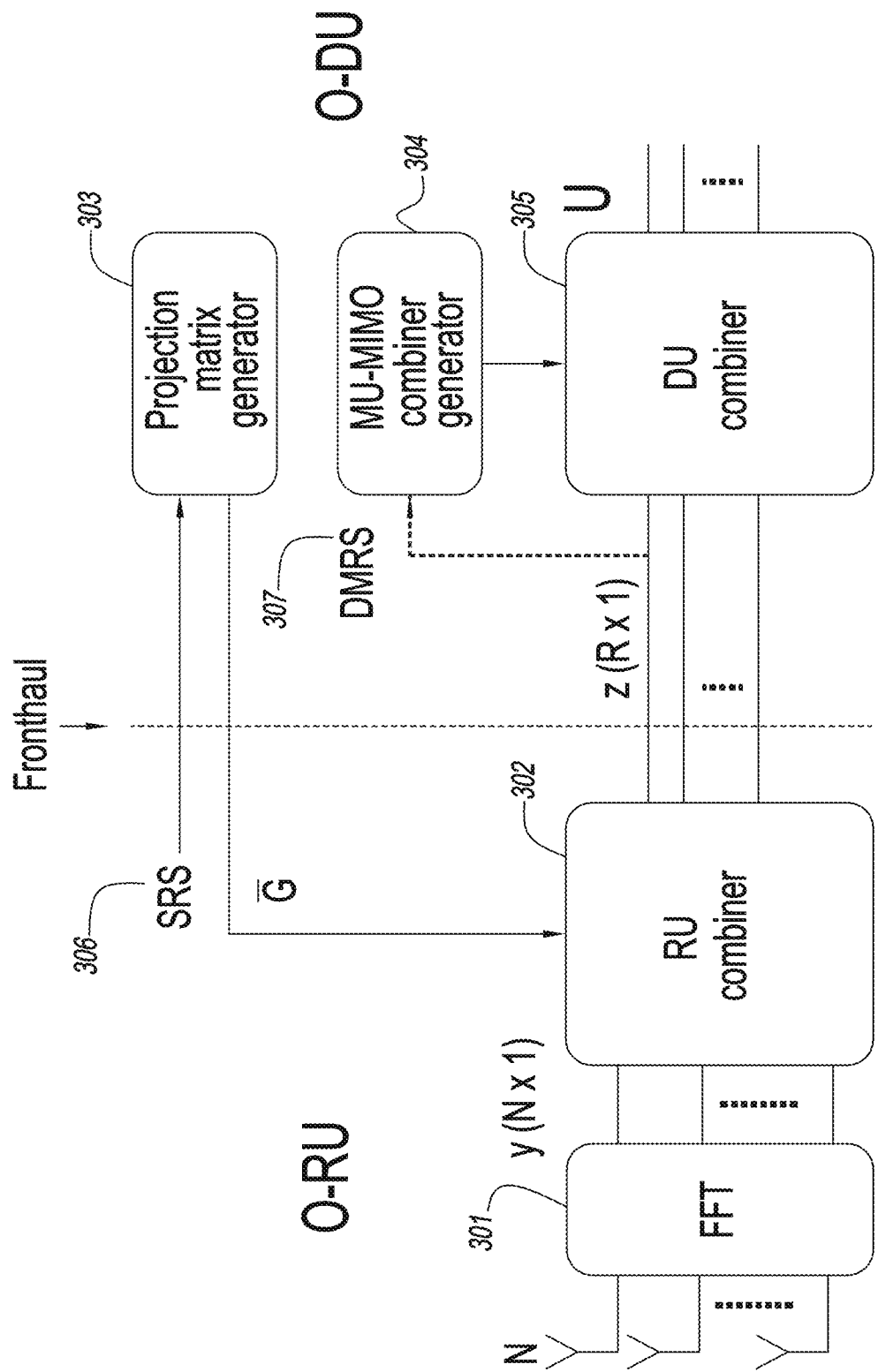
FIG. 4 illustrates a UL O-RAN receiver structure according to second example embodiment of the present disclosure.

FIG. 4 illustrates a UL O-RAN receiver structure according to second example embodiment of the present disclosure. At block 301, a fast Fourier transform (FFT) is performed on the received signals, and the output is passed through the RU combiner module 302. The number of output streams of the RU combiner module 302 is reduced to the maximum available number of streams (R), and the reduced streams are sent to the O-DU. Then, O-DU input IQ data applies DU-combiner 305, and the number of streams is reduced to U.

The projection matrix generator 303 can utilize a codebook that is N-by-N orthogonal matrix, which is generated by either discrete Fourier transform (DFT) matrix or type I codebook. Instead of applying the received signal at the O-RU as done in the first example embodiment described above in connection with FIG. 3, SRS 306 across all antennas is applied to generate (calculate) the projection matrix at the projection matrix generator 303. In the example embodiment shown in FIG. 4, SRS 306 is sent from the O-RU to the O-DU without compression (e.g., the RU combiner module 302 is not applied on SRS 306). Since the RU combiner module 302 is calculated at the O-DU and sent to the O-RU in this example embodiment, the O-RU does not need to calculate any matrix to obtain the RU combiner module 302. In this example embodiment, note that the O-RU does not have the ability to calculate complex algorithms. It should be noted that the performance would be degraded (e.g., in comparison to the first example embodiment) by using SRS to calculate the RU combiner, as the RU combiner obtained by using SRS would be outdated.

The MU-MIMO combiner at the O-DU MU-MIMO combiner generator module 304 is calculated (generated) based on compressed DMRS 307 (e.g., IQ data across all antennas is compressed by RU combiner). The MU-MIMO combiner can be either ZF or MMSE-IRC, while the O-DU combiner 305 can be any type of multi-user combiner. Since the MU-MIMO combiner is calculated (generated) based on DMRS 307 in this example embodiment, channel aging problem would not happen (DMRS is transmitted every slot). On the other hand, the performance can be degraded by loss from the compression of DMRS 307, which is done by the RU combiner 302. The MU-MIMO combiner (matrix) generated by the MU-MIMO combiner generator 304 is sent to the DU combiner 305 and applied on the DU combiner 305.

In connection with the second example embodiment of the present disclosure illustrated in FIG. 4, the impact on the O-RAN operation (i.e., novel modifications provided herein) include the following:

Define a new combining mode via M-plane:
    Default mode can be: Existing SRS-based method.
    New mode provided: DMRS/SRS-based split combining mode.
    RU should report whether it can support this new mode (DMRS/SRS-based split combining mode). One example implementation is adding a new feature in YANG module: o-ran-module-cap.yang Module to allow the RU to report if it can support the new combining mode).
    If yes, DU can configure the O-RU to use this method/mode. One example implementation is modifying YANG: o-ran-uplane-confyang Module to reflect this new configuration.
DU sends the RU combining weights (defined for the RU combiner) via C-plane messages to RU.
RU sends R streams to DU instead of U (data layers for UE).
Define a bit mask in the eAxC ID to include z (R×1) for CAT-B (i.e., streams instead of layers for CAT-B).

Figure 5:
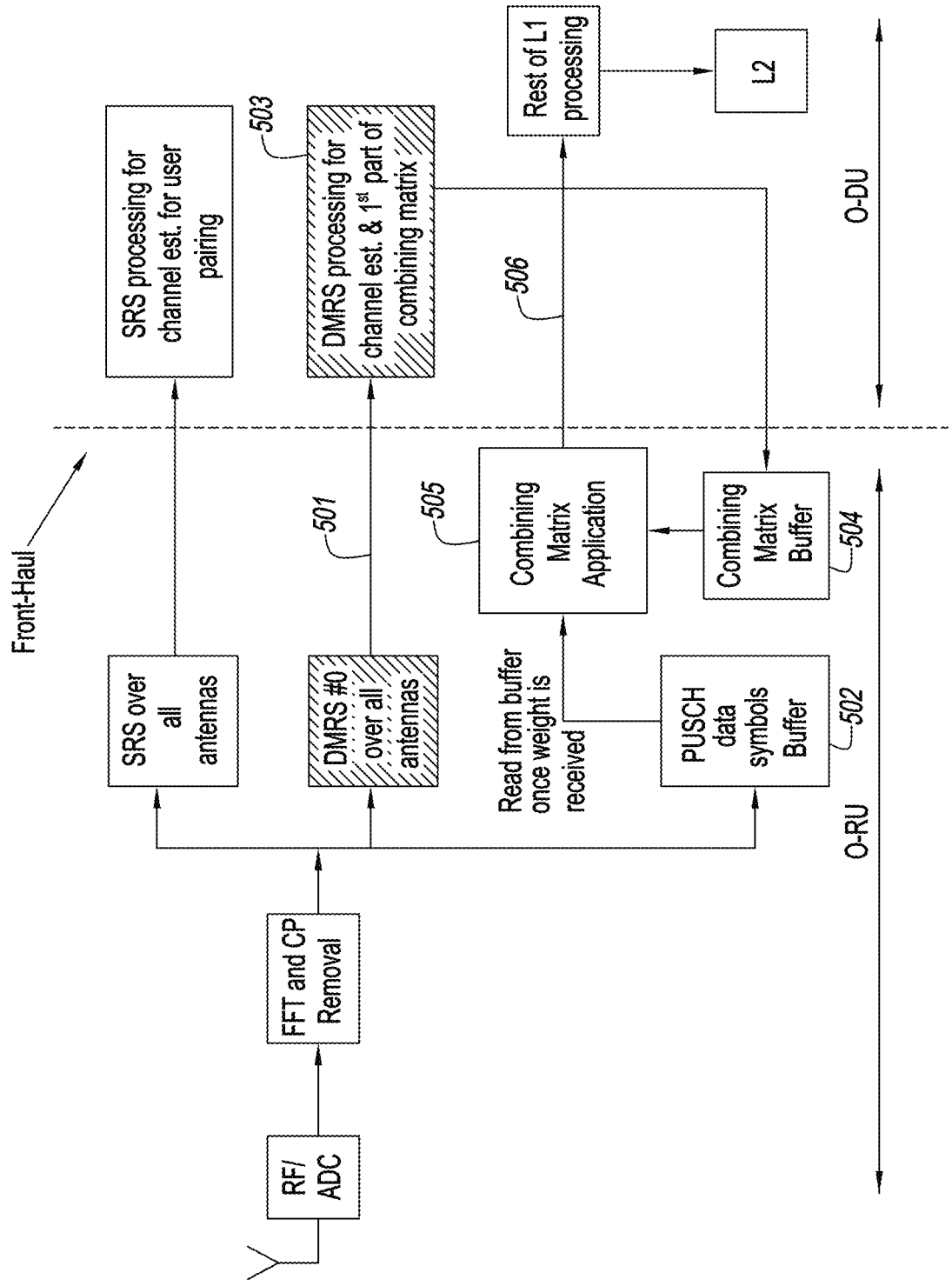
FIG. 5 illustrates third example embodiment of the present disclosure.

FIG. 5 illustrates a third example embodiment of the present disclosure. The O-RU sends the pre-processed DMRS signal (across all antennas) for a given TTI to DU, as represented by the process arrow 501. The O-RU buffers the PUSCH data samples locally, e.g., at the PUSCH data symbols buffer 502. The O-DU calculates, at block 503, the combiner matrix based on the DMRS signal and sends the combiner matrix to the O-RU, e.g., to the combining matrix buffer 504. The O-RU applies, at block 505, the combiner matrix to the buffered IQ data and sends (as represented by the process arrow 506) the output to the O-DU.

In connection with the third example embodiment of the present disclosure, the impact on the O-RAN operation (i.e., novel modifications provided herein) include the following:

For the case of CAT-B O-RU sending pre-processed DMRS signal (across all antennas) for a given TTI to O-DU.:
Option 1:
  Define a new section extension (only applicable for CAT-B O-RUs) associated with the C-plane message to request the O-RU to send the associated U-plane message IQ data (e.g., DMRS) across all antennas (i.e., send IQ right away after reception prior to applying the combining matrix).
Option 2:
  Similar to SRS, the RU needs to deal with DMRS as non-delay managed traffic and assign specific eAxC IDs to the DMRS signals via M-plane (Those eAxC IDs refer to the rx antennas used to transfer the DMRS). Note that the original eAxC IDs are defined for CAT-B for layers, not for antennas
  Define bitmasks for non-delay managed traffic such as SRS and DMRS. These bitmasks are part of the RU port ID. Example

```
<e-axcid>
  <o-du-port-bitmask/>
  <band-sector-bitmask/>
  <ccid-bitmask/>
  <ru-port-bitmask/>
    <band-bitmask/>
    <sector-bitmask>
    <channel-type-bitmask/>
    <layer-antenna-port-bitmask/>
    <eaxc-id/>
</e-axcid>
```

Similar to the first and second example embodiments, a new mode for UL combining is defined for the third example embodiment so that the RU reports if it supports this new combining mode and the DU can choose to configure it. This new combining mode can be called DMRS-based Single Combiner.

Figure 6:
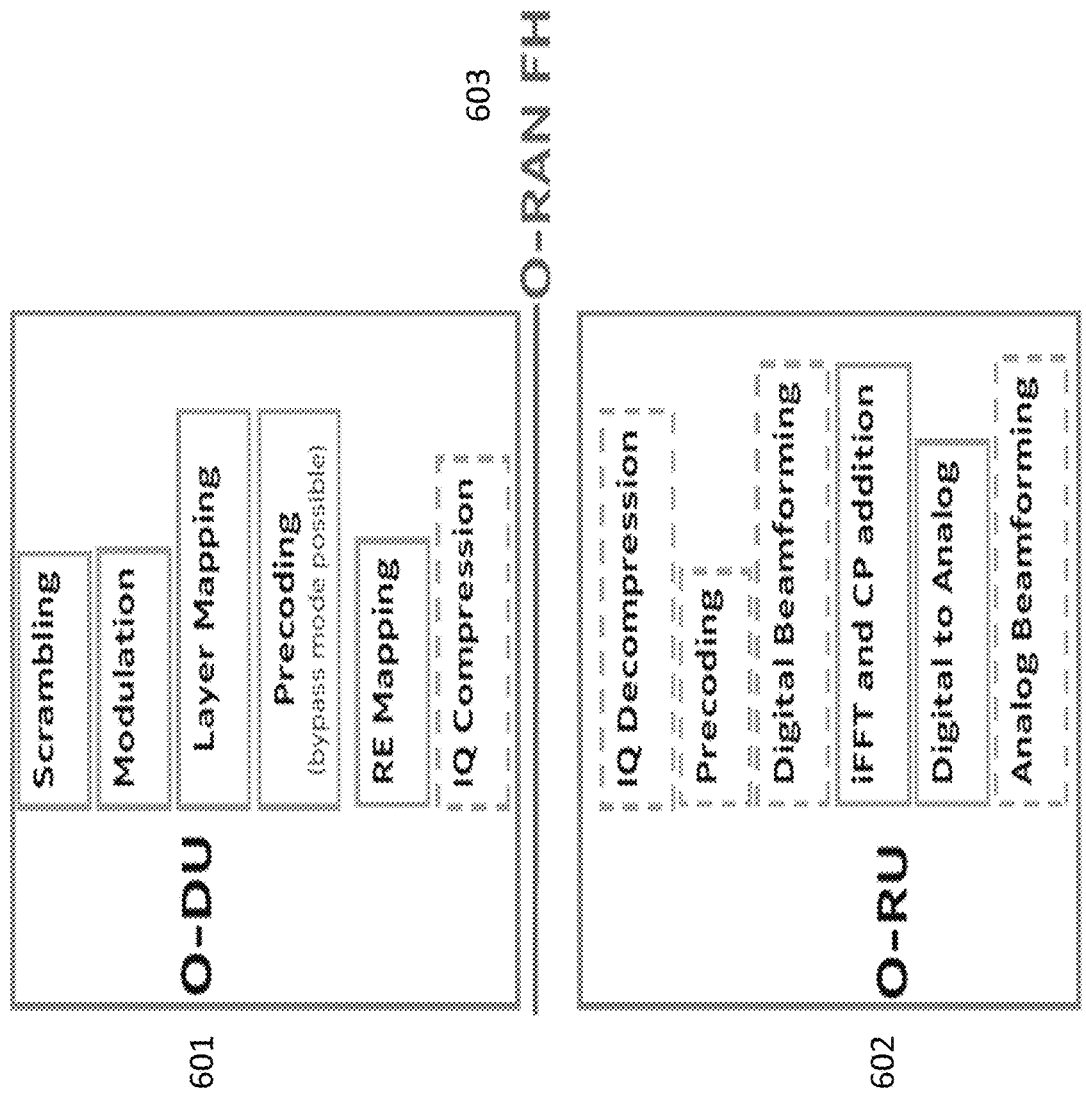
FIG. 6 illustrates an example O-RAN system architecture.

FIG. 6 illustrates an example O-RAN system architecture, in which the upper physical layer (U-PHY) blocks such as the scrambling, modulation, layer mapping, RE mapping, and I/Q compression (as well as optional precoding, which may be bypassed in bypass mode) can be implemented in the O-DU 601. The I/Q decompression, precoding, digital beamforming, IFFT, CP addition, digital-to-analog conversion, and optionally analog beamforming can be implemented in the O-RU 602. O-RAN fronthaul (FH) 603 is shown between O-DU and O-RU.

As a summary, several examples of the method according to the present disclosure are provided.

A first example of the method according to the present disclosure provides a method of generating and applying combining weights to Physical Uplink Shared Channel (PUSCH) symbols for Open Radio Access Network (O-RAN) fronthaul interface between O-RAN radio unit (O-RU) and O-RAN distributed unit (O-DU), comprising:
  calculating, by the O-RU, a projection matrix using the codebook;
  generating, by the O-RU, an RU combiner matrix, using the codebook;
  applying, by the O-RU, the RU combiner matrix to In-phase and Quadrature (IQ) data to generate compressed IQ data;
  compressing, by the O-RU, PUSCH and demodulation reference signal (DMRS) symbols from the RU combiner matrix;
  sending, by the O-RU, the compressed IQ data associated with the compressed DMRS symbols to the O-DU;
  calculating, by the O-DU, a DU combiner matrix from the compressed DMRS symbols;
  applying, by the O-DU, the DU combiner matrix to the compressed PUSCH symbols; and
  generating, by the O-DU, a multiuser multiple input, multiple output (MU-MIMO) combiner matrix.

A second example of the method according to the present disclosure provides a method of generating and applying combining weights to Physical Uplink Shared Channel (PUSCH) symbols for Open Radio Access Network (O-RAN) fronthaul interface between O-RAN radio unit (O-RU) and O-RAN distributed unit (O-DU), comprising:
  sending, by the O-RU, a sounding reference signal (SRS) for multiple antennas to the O-DU;
  calculating, by the O-DU, a projection matrix from a codebook;
  generating, by the O-DU, an RU combiner matrix;
  sending, by the O-DU, the RU combiner matrix to the O-RU;
  applying, by the O-RU, the RU combiner matrix to In-phase and Quadrature (IQ) data to generate compressed IQ data;
  compressing, by the O-RU, PUSCH and demodulation reference signal (DMRS) symbols from the RU combiner matrix;
  sending, by the O-RU, the compressed IQ data associated with the compressed DMRS symbols to the O-DU;
  calculating, by the O-DU, a DU combiner matrix from the compressed DMRS symbols;
  applying, by the O-DU, the DU combiner matrix to the compressed PUSCH symbols; and
  generating, by the O-DU, a multiuser multiple input, multiple output (MU-MIMO) combiner matrix.

A third example of the method according to the present disclosure provides a method of operating an Open Radio Access Network (O-RAN) fronthaul interface between O-RAN radio unit (O-RU) and O-RAN distributed unit (O-DU), comprising:
  splitting an uplink massive multiple input, multiple output (mMIMO) combiner into i) an O-RU combiner residing in the O-RU and ii) an O-DU combiner residing in the O-DU.

A fourth example of the method according to the present disclosure modifying the third example of the method further comprises:
  compressing, at the O-RU combiner, a first number of received signals to a second number of streams less than the first number; and
  sending, by the O-RU combiner, the compressed second number of streams to the O-DU via the fronthaul interface.

A fifth example of the method according to the present disclosure modifying the fourth example of the method further comprises:
  applying, at the O-DU, multiuser, multiple input, multiple output (MU-MIMO) combining by the O-DU combiner to the compressed second number of streams; and
  reducing the output streams of the MU-MIMO combining to the number of users streams.

A sixth example of the method according to the present disclosure modifying the fifth example of the method further comprises:
  generating, at the O-DU, the MU-MIMO combiner matrix based on the compressed DMRS.

A seventh example of the method according to the present disclosure modifying the fifth example of the method further comprises:

compressing, at the O-RU combiner, demodulation reference signal (DMRS) symbols from multiple antennas to a selected number of streams of compressed DMRS; and applying, at an MU-MIMO combiner generator, the selected number of streams of compressed DMRS.

In an eighth example of the method according to the present disclosure modifying the first example of the method, at least one of:

a) the projection matrix is obtained by the best codebook search;

b) the codebook is one of i) a single discrete Fourier transform (DFT) matrix or ii) a set of matrices from type I codebook; and c) the O-RU generates and buffers the codebook.

In a ninth example of the method according to the present disclosure modifying the second example of the method, the codebook is one of i) a single discrete Fourier transform (DFT) matrix or ii) a set of matrices from type I codebook.

In a tenth example of the method according to the present disclosure modifying the eighth example of the method, the first symbol of transmission time interval (TTI) is used as an input of a projection matrix generator, and the projection matrix generator obtains the projection matrix incorporated with the codebook.

In an eleventh example of the method according to the present disclosure modifying the ninth example of the method, the first symbol of transmission time interval (TTI) is used as an input of a projection matrix generator, and the projection matrix generator obtains the projection matrix incorporated with the codebook.

A twelfth example of the method according to the present disclosure modifying the first example of the method further comprises:

sending, by the O-DU, the codebook to the O-RU via the fronthaul interface; and buffering, by the O-RU, the codebook.

In a thirteenth example of the method according to the present disclosure modifying the twelfth example of the method, the buffered codebook is not updated periodically.

A fourteenth example of the method according to the present disclosure provides a method of operating an Open Radio Access Network (O-RAN) fronthaul interface between O-RAN radio unit (O-RU) and O-RAN distributed unit (O-DU), comprising:

generating, at the O-DU, a projection matrix by using i) pre-processed SRS received from a user equipment over the air interface and ii) a buffered codebook.

A fifteenth example of the method according to the present disclosure modifying the second example of the method further comprises:

at least one of i) sending, by the O-DU, the projection matrix calculated by the O-DU to the O-RU, ii) applying, by the O-RU, the projection matrix to an O-RU combiner module, and iii) calculating, by the O-DU, the codebook.

A sixteenth example of the method according to the present disclosure modifying the first example of the method further comprises:

at least one of i) calculating, by the O-DU, the codebook, and ii) sending, by the O-DU, the codebook to O-RU.

A seventeenth example of the method according to the present disclosure modifying the first example of the method further comprises:

reporting, by the O-RU via management plane to an O-RU controller, whether the O-RU supports demodulation reference signal (DMRS)-based split combining mode; and if the O-RU supports the DMRS-based split combining mode, configuring the O-RU by the O-RU controller via the management plane to operate in the DMRS-based split combining mode.

An eighteenth example of the method according to the present disclosure modifying the seventeenth example of the method further comprises:

sending, by the O-RU to the O-DU via the fronthaul interface, a number of data streams in the DMRS-based split combining mode larger than the number of data layers for UEs.

A nineteenth example of the method according to the present disclosure modifying the second example of the method further comprises:

reporting, by the O-RU via management plane to an O-RU controller, whether the O-RU supports demodulation reference signal (DMRS) and sounding reference signal (SRS)-based split combining mode; and if the O-RU supports the DMRS and SRS-based split combining mode, configuring the O-RU by the O-RU controller via the management plane to operate in the DMRS and SRS-based split combining mode.

A twentieth example of the method according to the present disclosure modifying the nineteenth example of the method further comprises:

sending, by the O-RU to the O-DU via the fronthaul interface, a number of data streams in the DMRS and SRS-based split combining mode larger than the number of data layers for UEs Glossary of Terms 3GPP: Third generation partnership project
A1: Interface between Non-RT RIC in an SMO and Near-RT RIC for RAN
OptimizationCAPEX: Capital Expenditure
CBRS: Citizens Broadband Radio Services
CC: Component carrier
COTS: Commercial off-the-shelf
CP: cyclic prefix
C-plane: Control plane
C-RAN: cloud radio access network
CU: Central unit
DCI: downlink control indicator
DL: downlink
DMRS: demodulation reference signal
DU: Distribution unit
eAxC ID: Extended Antenna-Carrier identifier: a data flow for a single antenna (or
spatial stream) for a single carrier in a single sector.
eNB: Evolved. Node B
FCAPS: Fault, Configuration, Accounting, Performance, Security
FDD: Frequency-division duplex
FEC: forward error correction
Fronthaul
FFT: Fast Fourier Transform
iFFT: inverse Fast Fourier Transform
IQ: In-phase and Quadrature
HARQ: hybrid automatic repeat request
LTE: long term evolution
LTE-A: LTE Advanced
M-plane: Management plane MCS: modulation and coding scheme
MIMO: multiple input, multiple output
mMIMO: massive multiple input, multiple output
MU-MIMO: multiuser, multiple input, multiple output
MMSE-IRC: Minimum mean square error—interference rejection combining
MMSE-MIRC: Minimum mean square error—maximum-ratio combining
mmWave: millimeter wave
MNO: Mobile network operator
Near RT RIC: Near-Real-Time RAN Intelligent Controller
Non-RT RIC: O-RAN Non-Real-Time RAN Intelligent Controller
NR: New radio
OAM: Operation and management
O1: Interface between SMO framework specified in O-RAN Architecture and O-RAN managed elements, for operation and management, by which FCAPS management, PNF software management, and file management are achieved
O2: Interface between SMO framework as specified in O-RAN architecture and the O-Cloud for supporting O-RAN virtual network functions
O-Cloud: A cloud computing platform that includes a collection of physical infrastructure nodes that meet O-RAN requirements to host relevant O-RAN functions (such as Near-RT RIC, O-CU-CP, O-CU-UP, and O-DU), supporting software components (such as Operating System, Virtual Machine Monitor, and Container Runtime), and management and orchestration functions
O-CU: O-RAN Centralized Unit
O-DU: O-RAN Distributed Unit
O-RU: O-RAN Radio Unit
O-RAN: Open RAN (Basic O-RAN specifications are prepared by the O-RAN alliance)
OPEX: Operating Expense
PBCH: Physical Broadcast Channel
PCFICH: Physical Control Format Indicator Channel
PDCCH: Physical downlink Control Channel
PDCP: Packet Data Convergence Protocol
PDSCH: physical downlink shared channel
PHICH: Physical Hybrid ARQ Indicator Channel
PHY: physical layer
   LPHY: lower physical layer
   UPHY: upper physical layer
PNF: Physical Network Function
PUCCH: Physical Uplink Control Channel
PUSCH: Physical Uplink Shared Channel
QAM: quadrature amplitude modulation
QPSK: Quadrature Phase Shift Keying
RACH: random access channel
   PRACH: physical random access channel
RF: radio frequency interface
RLC: Radio Link Control
RRC: Radio Resource Control
RRH: Remote Radio Head
RRM: Radio resource management
RRU: Remote radio unit
RU: Radio Unit
RS: reference signal
RS SI: received signal strength indicator
S-plane: Synchronization plane
SCell: Secondary cell
SIMO: single input, multiple output
SINR: signal-to-interference-plus-noise ratio
SRS: Sounding reference signal
SSS: Secondary Synchronization Signal
TB: transport block
TRP: Transmission Reception Point
TTI: Transmission Time Interval
TDD: Time division duplex
U-plane: User plane
UCI: Uplink Control Information
UE: user equipment
UL: uplink
UL DMRS: uplink demodulation reference signal
ULSCH: Uplink Shared Channel
vBBU: Virtualized baseband unit
VNF: Virtual Network Function
ZF: Zero-Forcing

What is claimed is:

1. A method of optimizing an uplink massive multiple input, multiple output (mMIMO) combining operation in an Open Radio Access Network (O-RAN) fronthaul interface between O-RAN radio unit (O-RU) and O-RAN distributed unit (O-DU), comprising:
splitting an uplink (UL) massive multiple input, multiple output (mMIMO) combiner into i) an O-RU combiner for the UL mMIMO residing in the O-RU and ii) an O-DU combiner for the UL mMIMO residing in the O-DU;
compressing, at the O-RU combiner, a first number of received signal streams and associated demodulation reference signal (DMRS) symbols from multiple antennas to a second number of signal streams and associated streams of compressed DMRS less than the first number of the received signal streams;
sending, by the O-RU combiner, the compressed second number of signal streams and associated streams of compressed DMRS to the O-DU via the fronthaul interface;
generating, at an MU-MIMO combiner generator of the O-DU, an MU-MIMO combiner matrix based on the streams of compressed DMRS;
sending, by the O-DU combiner, the generated MU-MIMO combiner matrix based on the streams of compressed DMRS to a O-RU combiner buffer;
implementing, at the O-DU combiner, multiuser, multiple input, multiple output (MU-MIMO) combining by applying the MU-MIMO combining matrix to the compressed second number of signal streams; and
reducing, by the O-DU combiner, the output streams of the MU-MIMO combining at the O-DU combiner to the number of users streams.

2. The method according to claim 1, further comprising:
providing, by the O-RU to the O-DU, an indication of whether the O-RU supports a split UL mMIMO combining mode; and
configuring, by the O-DU, the O-RU to utilize the split UL mMIMO combining mode in the case the O-RU supports the split UL mMIMO combining mode.

* * * * *